Sept. 17, 1957 R. L. CARBREY 2,806,950

CIRCULATING PULSE DECODER

Filed March 28, 1956 2 Sheets-Sheet 1

INVENTOR
R. L. CARBREY
BY Harry C. Hart
ATTORNEY

Sept 17, 1957 R. L. CARBREY 2,806,950

CIRCULATING PULSE DECODER

Filed March 28, 1956 2 Sheets-Sheet 2

INVENTOR
R. L. CARBREY
BY Harry C. Hart
ATTORNEY

United States Patent Office 2,806,950

Patented Sept. 17, 1957

2,806,950

CIRCULATING PULSE DECODER

Robert L. Carbrey, Madison, N. J., assignor to Bell Telephone Laboratories, Incorporated, New York, N. Y., a corporation of New York Application March 28, 1956, Serial No. 574,521

15 Claims. (Cl. 250—27)

This invention relates to receivers for communication systems and more particularly to decoders for use in the receiving equipment of communication systems employing pulse code modulation.

In communication systems utilizing pulse code modulation, a speech wave or other signal to be transmitted is sampled periodically to ascertain its instantaneous amplitude. The measured instantaneous amplitude is expressed by pulse codes analogous to telegraph codes.

One code which conveniently may be employed in pulse code modulation involves permutations of a fixed number of code elements, each of which may have any one of several conditions or values. An advantageous code of this sort is the so-called binary code in which each of the fixed number of code elements may have either of two values. One way of representing these values is to represent one of them by a pulse, sometimes referred to as an "on" pulse and the other by the absence of a pulse, sometimes referred to as an "off" pulse. Alternatively, one value may be represented by a positive pulse and the other by a negative pulse. The total number of permutations obtainable with the binary code is proportional to $2^n$ where $n$ is the number of code elements of a code pulse group or character.

Because the total number of different signal amplitudes which may be represented by such a code of a fixed number of elements is limited, it is customary to divide the continuous range of amplitude values of which the transmitted signal is capable into a fixed number of constituent ranges which together encompass the total range. Each of these smaller or constituent amplitude ranges may then be treated as if it were a single amplitude instead of a range and is represented by an individual one of the permutations of the code. In the use of this method of code transmission the instantaneous amplitude ascertained by a sampling operation is represented by the respective permutation indicative of the amplitude range, or step, which most nearly approximates the amplitude of the measured sample. If, for example, the sample amplitude is nearest to that amplitude represented by the ninth step of the signal amplitude range the permutation code corresponding to range 9 is transmitted.

It is a fundamental characteristic of any such system that each code element in one of its values represents the presence in the sampled amplitude of a particular fixed portion of the total amplitude range, while in the other value it represents the absence of that same portion.

Once the signal to be transmitted has been encoded and transmitted to a receiver station in the form of a series of groups of code pulses, the code groups must there be decoded and information obtained therefrom employed in the reconstruction of the original signal wave. In general, the operations to be performed at the receiving station include the weighting of each of the received code group pulses in accordance with the portion of the total complex wave amplitude which it represents, the accumulation of such weighted pulses of each code pulse group, and the summation thereof to obtain the amplitude sample represented by that code pulse group. The amplitude samples thus obtained from successive code pulse groups represent the original wave to be transmitted.

Of the many systems which have heretofore been proposed for the decoding of trains of binary code pulse groups, one which is of special interest in the present connection is that described in Carbrey Patent 2,579,302, issued December 18, 1951. That system utilizes for the decoding operation of feedback network having a gain (or loss) factor of 2 and a round trip delay equal to the interval between successive code element pulses of the code pulse groups to be decoded. The feedback network may be of the circulating loop type or of the reflection type. The pulses are applied in succession to the input terminal of the network and, as a result of each round trip, each pulse is increased (or reduced) in magnitude by a factor 2 and delayed in time by a single pulse interval. The earliest pulse to arrive makes a number of complete round trips through the feedback network which is equal to the number of code elements in the group. The next pulse to arrive makes one less complete round trip, and so on. At the conclusion of the pulse group there are present at the output terminal of the network a number of pulses of amplitudes proportional to various powers of 2. The output of the network is then sampled at the conclusion of each code group to give a signal which is proportional to the sum of the pulses which are there and then present; and this signal is, identically, the desired decoded amplitude sample.

It is a requirement of that system that the pulses to be thus added together shall all be of the same polarity. This places stringent requirements of the feedback network that it shall be capable of translating signal components of zero or very low frequencies without distortion. When these stringent requirements are not rigorously met, a zero wander or drift takes place which results in an incorrect decoded amplitude.

Accordingly, it is a principal object of the present invention to provide decoding equipment for binary code pulse groups in which the stringency of the requirements for transmission of components of zero or very low frequencies is greatly reduced.

This object is attained, in accordance with the present invention in one of its principal illustrative forms, by arranging that each incoming pulse shall make two round trips in a feedback network for each corresponding round trip of the Carbrey patent. This is done by proportioning the feedback network to introduce, for each round trip, a delay of one-half interpulse interval and to provide a gain (or loss) of $\sqrt{2}$. After each single round trip a pulse is increased (or reduced) in magnitude by $\sqrt{2}$ and delayed by one-half interpulse interval. After two such round trips, it is evidently increased (or reduced) by 2 and delayed by a full interpulse interval. For a code pulse group of a given number $n$ of code elements, the first pulse thus makes $2n$ round trips, the second $2n-2$ round trips, and so on. Summation and evaluation are carried out, as in the Carbrey patent, by sampling the output of the network at the conclusion of the code pulse group.

The employment of this even number relation permits the use of a phase-inverting network such that after the first round trip or any odd number of round trips, the output pulse is inverted in polarity and has a magnitude which is not related to the input pulse magnitude by a power of 2 but differs from such relation by $\sqrt{2}$. Each of these inverted polarity pulses occurs in the center of an interpulse interval. They do not contribute to the sampled output and are ignored. Within the feedback network itself, however, these negative pulses tend to balance the train of positive pulses so that the zero or low frequency component of the entire pulse train, taken as a whole, is greatly reduced.

These numerical relationships may evidently be generalized to include all cases in which the pulse makes, during each full interpulse interval, an even number of round trips in the course of all of which together it is increased or reduced in amplitude by a factor 2 and delayed by a single interpulse interval. Thus, if four round trips are considered desirable, the network is proportioned to provide a gain or loss factor of $$(2)^{\frac{1}{4}}$$

and a delay of one-quarter pulse interval for each round trip; and, in general, for any even number $2r$ of round trips, the network is proportioned to provide a gain or loss factor of $$(2)^{\frac{1}{2r}}$$

and to introduce a delay of $$\frac{T}{2r}$$

where T is the interpulse interval and $r$ is any integer.

The invention is equally applicable to a three-valued or "ternary" code, and to a four-valued or quatenary code and, in general, to a pulse code in which each pulse may adopt any one of a set of $m$ different discrete values. For example, with the three-valued code, for which $m=3$, and the smallest even number of round trips, two, is employed, the network should be proportioned to give a pulse gain (or loss) of $\sqrt{3}$ for each round trip, and a delay of one half interpulse interval, as before. If four round trips are employed, the gain or loss should be $$(3)^{\frac{1}{4}}$$

and the round trip delay should be one quarter of the interpulse interval. In general, for a code of $m$-valued pulses and any even number $2r$ of round trips, the required gain or loss is $$G \text{ or } L=(m)^{\frac{1}{2r}}$$

and the round trip delay is $$D=\frac{T}{2r}$$

The invention will be fully apprehended from the following detailed description of illustrative embodiments thereof, in which the number of code pulse values is two and the number of round trips per pulse interval is also two. These embodiments are shown in the appended drawings, in which.

Figure 1:
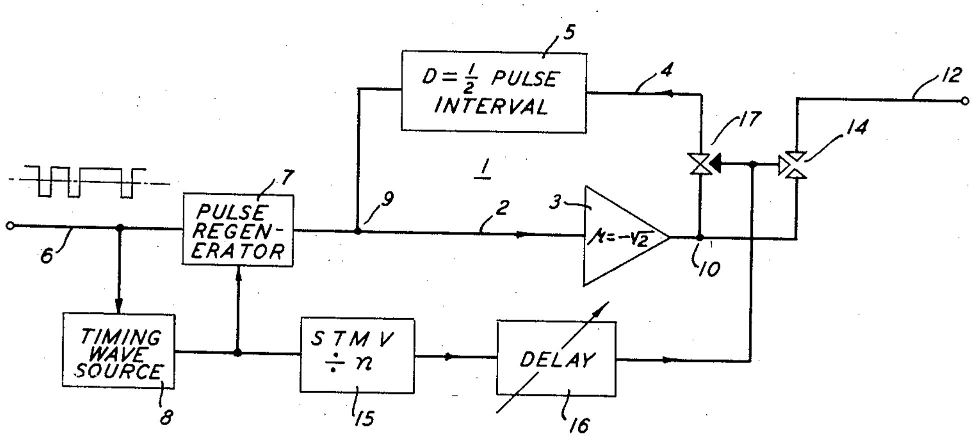
Fig. 1 is a block schematic diagram embodying the invention in one of its forms.
Figure 2:
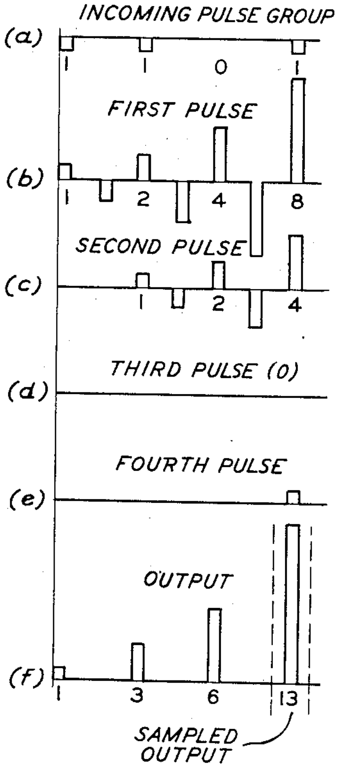
Fig. 2 is a waveform diagram of assistance in the exposition of the invention.

Fig. 1 illustrates diagrammatically one form of decoding apparatus embodying the invention. The heart of the system is a feedback network 1 comprising a forward path 2, containing a linear phase-inverting amplifier 3 and a feedback path 4 containing a delay device 5. These elements are proportioned to furnish, for the feedback network as a whole, a feedback factor, or $\mu\beta$ characteristic, of $\sqrt{2}$ and a delay around the feedback loop equal to one-half the interval between adjacent pulses of the code groups to be decoded. The pulses of an incoming train of code pulse groups to be decoded, appearing on an incoming line 6, are restored to standard amplitudes and instants of occurrence by a pulse regenerator 7 that is controlled by a timing wave from a source 8 which is coupled to the incoming line 5 and hence operates in synchronism with the pulses of the incoming train. After such regeneration they are applied in sequence to the input terminal 9 of the feedback network. The manner in which the feedback network carries out the decoding operation is as follows:

Let it be assumed that a binary code pulse group, for example a 4-element binary code pulse group as shown in graph $a$ of Fig. 2, is applied to the input terminal 9 of the feedback network 1, and that the code group pulses, which are of negative polarity and of substantially equal amplitudes, are applied in descending denominational order. Thus in the code pulse group of graph $a$ the first pulse (from the left) represents the largest portion of the total signal sample amplitude and succeeding pulses represent successively smaller portions of the total signal sample amplitude. The pulses of the four denominational orders, taken from the left, may thus represent amplitudes of 0 or 8, 0 or 4, 0 or 2 and 0 or 1, respectively, depending in each case upon whether the code element is represented by an "off" pulse or an "on" pulse, and the code group shown in graph $a$ represents an amplitude of 8+4+1 or 13 expressed in the decimal system of numeration.

Because the amplifier is a linear device the effect of each of the code group pulses applied to it may be considered separately and the total effect of the applied code pulse group may be obtained by the summation, at the conclusion of the code group, of the contributions from the several applied pulses. When a negative pulse, assumed to be of amplitude $$\frac{1}{\sqrt{2}}$$

is applied to the input terminal 9 of the feedback network, it is first amplied by a factor $\sqrt{2}$ and inverted in phase by the amplifier 3, to appear at the output terminal 10 of the amplifier 3 as a positive pulse of standard amplitude which will be taken as unity. After one complete circuit around the feedback loop it will again appear at the output terminal 10, this time with negative polarity and an amplitude of $\sqrt{2}$ units. After its next round trip, during which it is again inverted and again increased in magnitude by $\sqrt{2}$, it reappears again at the output terminal 10, this time with positive polarity and an amplitude of 2 units. By reason of the action of the delay device 5, the pulse completes its first two circuits around the feedback loop and appears at the output terminal 10 after a delay equal to an interval between adjacent elements of the code group. This positive pulse of amplitude 2 then makes two more trips around the loop and reappears at the output terminal 10 of the amplifier one pulse interval later with a positive amplitude of 4 units, and after two more trips around the loop, it appears at the output terminal 10 of the amplifier with a positive amplitude of 8 units. Thus, in response to each first pulse of any group, a series of positive pulses, spaced apart by intervals equal to the code element intervals of the code pulse groups, appears at the output of the amplifier, these pulses having amplitudes which are related as 1, 2, 4, 8 . . . $2^n$. Each of these pulses is the result of an even number of round trips. Between each pulse and the next, a negative pulse appears, resulting from an odd number of round trips. The amplitude of each such negative pulse is $\sqrt{2}$ times that of the pulse which precedes it and $$\frac{1}{\sqrt{2}}$$

times the amplitude of the pulse which follows it. Hence its amplitude is the geometrical mean of the amplitudes of its neighbor positive pulses, and a train of them has a low frequency component which provides a nearly perfect balance for the low frequency component of the positive pulse train. These negative pulses are not accumulated, nor are they employed in the evaluation of the decoded signal sample amplitude. They are disregarded.

The array of pulses, positive and negative, appearing at the output of the amplifier in response to a single input pulse is shown in graph *b*, Fig. 2.

When the second pulse of the code pulse group shown in graph *a* is applied to the input terminal 9, a similar sequence of positive pulses, related in amplitude as increasing powers of two, appears at the output terminal 10 with a negative pulse between each two of them. The first positive pulse of this array reaches the output terminal 10 simultaneously with the reappearance at the output terminal of the first code element pulse after its first two round trips. The pulses of the second sequence, which are shown in graph *c* of Fig. 2, occur in time positions corresponding to second, third and fourth pulses of the incoming code pulse group (*a*).

The third element of the code group chosen as an example is represented by an "off" pulse, and hence the output of the feedback network 1 in response to this denominational order is zero as shown in graph *d* of Fig. 2. The fourth pulse of the code group is an "on" pulse and appears at the output terminal 10 of the amplifier with an amplitude of 1 unit at the conclusion of the interval allotted to the last element of the code pulse group, namely the element of lowest denominational order.

Because the train of positive pulses appearing at the output terminal 10 in response to each of the applied pulses comprises individual positive pulses separated by intervals equal to the pulse intervals of the code group, and within which the auxiliary balancing negative pulses appear, the total amplitude of the output pulse from the feedback network 7 at the conclusion of the period allotted to any denominational order is equal to the sum of the contributions which have by then become available from the several applied pulses of the code pulse group. Thus, as shown in graph *f* of Fig. 2, the amplitude of the output of the feedback network 1 at the first pulse period is 1 unit, at the second it is 3 units, this being the contribution to the output from the first and second pulses as shown in graphs *b* and *c*. At the end of the period assigned to the third pulse the total output is of amplitude 6 units, there having been no contribution from an input during the third pulse period and the output at the conclusion of the second pulse period having been doubled. Finally, at the conclusion of the entire code pulse group, the output reaches an amplitude of 13 units comprising contributions of 8 units due to the first pulse, 4 units due to the second and 1 unit due to the fourth. This amplitude of 13 units is the decimal representation of the binary number 1101 corresponding to the code pulse group of graph *a* of the present example. If the output of the feedback network is sampled at the conclusion of the code group the output signal obtained corresponds to the sample amplitude which gave rise to the code pulse group applied to the amplifier.

The sampling operation is conveniently carried out by establishing a circuit path, theretofore disestablished, from the output terminal 10 of the feedback network 1 to an output conductor 12. This may readily be accomplished by the application of control pulses, coinciding in time with the last pulse of each code pulse group, to the control terminal of a switch 14. These control pulses may be derived from a single trip multivibrator 15 acting as a frequency divider to deliver a single pulse for each *n* pulses of the output of the timing wave source 8. These group pulses may be brought into time coincidence with the final element of each code pulse group by an adjustable delay device 16.

The feedback network 1 includes an amplifier 3 having positive gain. Hence it would eventually break into sustained oscillation if the process described above were allowed to continue indefinitely. Accordingly it is necessary, either during the time the output is being sampled or after the output has been sampled at the conclusion of each code pulse group, or at a time including both of these instants, to disable the network 1 to prevent oscillation and reset it for the decoding of a subsequent code group. This may be accomplished by the application to the control terminal of a switch 17, normally closed, of regular group pulses, one of which occurs at the conclusion of each code pulse group, thereby momentarily to disestablish the feedback path 4. Such pulses may be derived from the single trip multivibrator 15 by way of the adjustable delay device 16.

The invention has been described and illustrated in Figs. 1 and 2 as a decoder for code pulse groups in which the code element pulses are transmitted in descending denominational order. The invention is of equal use with code pulse groups in which the code elements are sent in the opposite order; that is, code pulse groups in which the pulse first transmitted represents the smallest portion of the total signal sample amplitude and succeeding pulses represent successively larger amplitude portions. In this instance the feedback network of Fig. 1 differs from that considered above only in that it introduces a "negative" gain, i. e., a loss, of $$\frac{1}{\sqrt{2}}$$

instead of a "positive" gain of $\sqrt{2}$. In addition, the amplitude of the pulse first appearing at the output in response to any applied pulse is taken as the largest amplitude portion of the coded signal sample amplitude, rather than the smallest; i. e., 8 units in the four-element code instead of unity as in the embodiment first described. Accordingly, the output of the feedback network 1 in response to a single pulse applied to the input terminal 9 is a series of pulses of amplitudes related as descending powers of two. Assuming for purposes of illustration a code group of four elements, in which the first, second and third denominational orders are represented by "on" pulses and the fourth by an "off" pulse, the binary number corresponding thereto will be 0111. This number corresponds to the decimal number 7 and accordingly to a signal sample amplitude of 7 units. Considering the decoding operation of the feedback network 1 with a net loss of $\sqrt{2}$, the pulses of each incoming code group are applied with negative polarity and an appropriate amplitude, namely $8\sqrt{2}$, to the input terminal 9; and for each "on" pulse of the code group, after it has made a single trip through the forward path 2, an output pulse appears which is taken arbitrarily to represent an amplitude of 8 units. Considering each pulse separately, the successive outputs of the network 1 in response to the first pulse of the illustrative code group comprises first 8 units; then, after two round trips 4 units; next, after two further round trips 2 units, and finally, after two last round trips, 1 unit; i. e., a series of pulses related as 8, 4, 2 and 1. Similarly the output of the network 1 in response to the second pulse comprises a series 8, 4, 2; the output in response to the third pulse comprises a series 8, 4, and there is no output in response to the final pulse which is an "off" pulse. As before, an auxiliary negative pulse appears between each positive pulse and the next, being due to an odd number of round trips. These series of useful positive output pulses may be represented as shown below in a fashion somewhat similar to that employed in the graphs of Fig. 2.

| | | | |
|---|---|---|---|
| 8 | 4 | 2 | 1 |
| | 8 | 4 | 2 |
| | | 8 | 4 |
| | | | 0 |
| | | | 7 |

Thus, if the output of the feedback network 1 is sampled at the conclusion of the fourth pulse, an amplitude of 7 units is obtained corresponding to the code group applied to the input terminal 9.

Since sustained oscillations can occur only when the network transmisison characteristics $\mu\beta \geqq 1$, there is no possibility, with a network for which $$\mu\beta = \frac{1}{\sqrt{2}}$$

that it will break into oscillation. However, it is still desirable to disable the feedback loop at the conclusion of the sampling operation, thereby to discharge the circuit and prepare it for decoding the next code group without interference from the prior one. The switch 17 performs this disabling operation as before.

Figure 3:
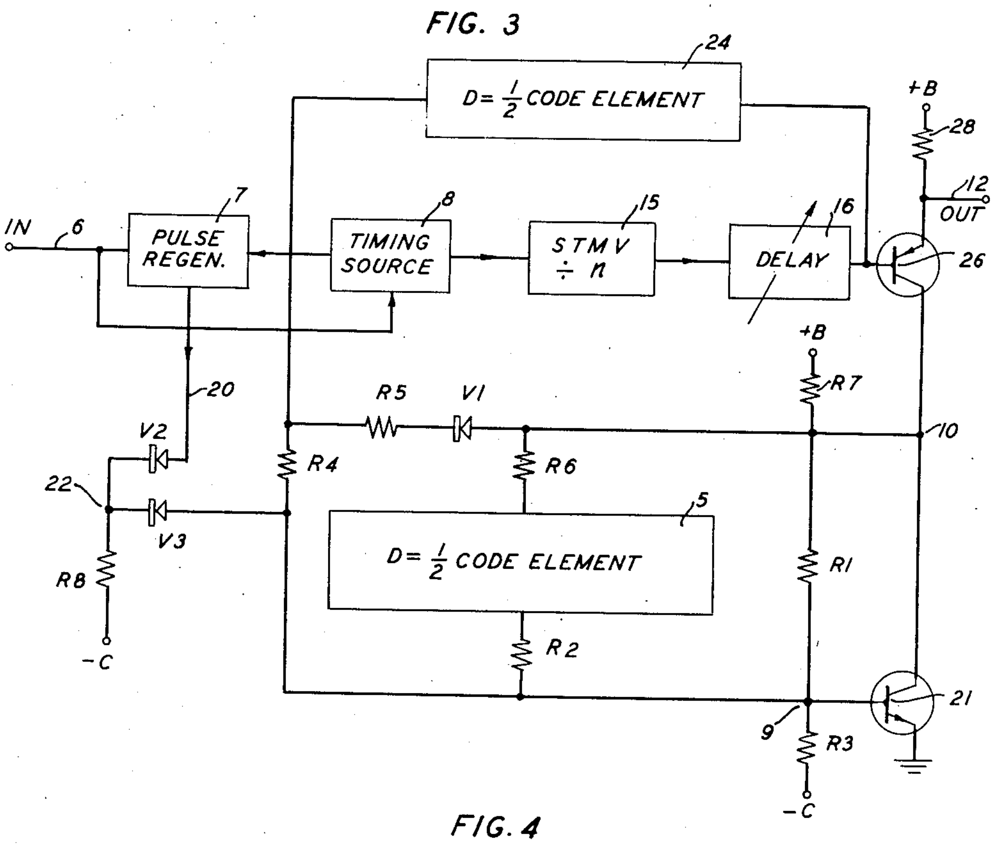
Fig. 3 is a schematic circuit diagram showing the details of the system of Fig. 1.

Fig. 3 shows the circuit details of the system of Fig. 1. Incoming code pulse groups appear on the conductor 6. The pulses are clipped and timed by the pulse regenerator 7 under control of a timing wave source 8 which is synchronized with the incoming pulses. It is assumed that the pulses delivered by the regenerator 7 are of negative polarity and that the potential of the output conductor 20 of the pulse regenerator 7, in the absence of a pulse, is positive.

A *p*-type transistor 21 together with a feedback resistor $R_1$ serves for the amplifier 3 of Fig. 1. The collector terminal of the transistor 21 constitutes the output terminal 10 of the feedback network. This output terminal is coupled back to the input terminal 9 of the amplifier, namely, the base electrode of the transistor, by way of two feedback paths. The first consists merely of the resistor $R_1$. This path is degenerative and is included to improve the stability of the amplifier and permit precise adjustment of its gain. The second feedback path comprises the resistors $R_6$ and $R_2$ with the one-half pulse interval delay device 5 interposed in tandem between them. Because every pulse traversing the delay device reaches the transistor base electrode only after the pulse directly applied to it from the incoming line has ceased, this second path is regenerative. It serves the purpose of the feedback path 4 of Fig. 1. The collector electrode of the transistor is supplied with current from a potential source B+ through a resistor $R_1$. The base electrode is connected to a point which is common to the resistor $R_1$ and another resistor $R_3$ connected in series between the collector electrode and a point of negative potential C−. The resistors $R_1$, $R_3$ and $R_7$ are proportioned in relation to the potentials of the sources B+ and C− in such a way that the transistor normally carries a current of about one half of the current which it can readily carry without overloading; e. g., 5 milliamperes.

Two bias current paths extend from the potential source C− through a resistor $R_8$ to a common point 22. The first extends from this point 22 through a varistor $V_3$ poled as shown to the base electrode of the transistor 21. The second extends from the common point 22 through another varistor $V_2$ to the output conductor 20 of the pulse regenerator 7.

In the absence of incoming code pulses, the potential of the output conductor 20 of the pulse regenerator 7 is positive. This holds the varistor $V_2$ in its low resistance condition and therefore holds the common point 22 at a positive potential which biases the varistor $V_3$ in its reverse condition. Hence no current flows through the resistor $R_8$ to the base electrode of the transistor 21. Upon the arrival of a code pulse, assumed to be of negative polarity, the conduction conditions of the varistors $V_2$ and $V_3$ are reversed. Negative current now flows from the source C− through the resistor $R_8$ and the varistor $V_3$ to the base electrode of the transistor 21. This tends to reduce the conduction of the transistor 21, and its collector potential rises. Immediately the input pulse ceases, the output conductor 20 of the pulse regenerator 7 rises again to its normal positive potential and the varistors $V_2$ and $V_3$ return to their original conditions. Meanwhile the momentary rise of potential of the collector electrode of the transistor 21 constitutes the first output pulse, as illustrated in curve B of Fig. 2. As explained in connection with Fig. 1, it is fed back through the delay device 5 to arrive, one-half pulse interval later, as a positive pulse at the base electrode of the transistor 21. Provided the gain of the transistor amplifier has been properly adjusted, this pulse has been magnified by a factor $\sqrt{2}$ in its trip around the feedback network. From here on, operations are repeated with a reversal of polarity and a delay of one-half pulse interval for each round trip around the feedback network.

Uncontrolled regeneration is readily prevented by application of a pulse from the single trip multivibrator 15, occurring in time coincidence with the last pulse of each incoming code pulse group, through an auxiliary delay device 24, which introduces a delay of one-half pulse interval, through a resistor $R_4$ to the base electrode of the transistor 21 and, simultaneously, through a resistor $R_5$ and a varistor $V_1$ to the collector electrode of the transistor 21. Application of this pulse to the transistor base electrode drives the transistor 21 below cut-off and so disables the feedback path 4. Simultaneous application of it to the collector electrode of the transistor 21, by way of a resistor $R_5$ and a varistor $V_1$ prevents a change of collector potential with a consequent increase of the current which would otherwise flow from the collector electrode to the base electrode by way of either or both of the two feedback paths.

Any suitable sampler of the output of the collector electrode of the transistor 21 may be employed. By way of illustration, there is shown a transistor switch as disclosed in a copending application of P. A. Reiling, Serial No. 410,924, filed February 17, 1954. The collector electrode of an auxiliary N type transistor 26 is connected directly to the collector electrode of the main transistor 21 and its emitter electrode is connected by way of a load resistor 28 to the source point B+. Application of negative pulses from the single trip multivibrator 15, occurring at the pulse group rate, by way of the delay device 16 to the base electrode of this auxiliary transistor 26 causes it to operate as a switch, and thereby to apply the output of the main transistor 21 across the load resistor 28 and so to the outgoing conductor 12.

The manner in which the amplifier gain is adjusted to the required value will be understood from the following considerations:

Assume that at a particular moment a voltage $e_d$ appears at the output terminal of the delay device 5 in the feedback path 4. This voltage corresponds to a current, flowing in the resistor $R_2$, of magnitude $$i_b = \frac{e_d}{R_2}$$

Because the input impedance of the transistor is low compared with the resistances of resistor $R_1$ and $R_3$, substantially this entire current flows into the base electrode of the transistor 21. This in turn causes a current $$i_c = \frac{\alpha}{1-\alpha}\,\frac{e_d}{R_2}$$

to flow in the collector circuit of the transistor 21.

With a transistor in which the current multiplication factor $\alpha$ is very close to unity, this collector current is very large, and hence develops a large negative-going voltage $-e_c$ across the load resistor $R_7$. The gain through this action is much greater than the required value $\sqrt{2}$. However, as this large inverted voltage starts to develop in the collector circuit of the transistor 21, the voltage across the resistor $R_1$ drops, and the drop is accompanied by a current $$i_b' = -\frac{e_c}{R_1}$$

which is introduced, along with the current $i_b$, into the base electrode of the transistor 21 and tends to cancel it. With a value of unity for $\alpha$ the cancellation is, ideally, perfect, and a substantial collector current results from an infinitesimal base current. In this ideal case, the two components of the base current being alike in magnitude, $$i_b=-i_b'=\frac{e_d}{R_2}=\frac{e_c}{R_1}$$

and therefore $$\frac{e_c}{e_d}=\frac{R_1}{R_2}$$

Hence, to secure a gain factor of $\sqrt{2}$, it is only necessary so to proportion the resistors $R_1$ and $R_2$ that their ratio is equal to 1.414 . . .

The current multiplication factors of transistors which are presently available are sufficiently close to unity to permit securing the required gain, to a close approximation, with resistors having these magnitudes. Final given adjustment can readily be made by minor empirical trimming of the magnitudes of the resistors.

When the gain required is $$\frac{1}{\sqrt{2}}$$

the resistors $R_1$ and $R_2$ should, by the same token, be so proportioned that their ratio is $$\frac{R_1}{R_2}=0.707\ldots$$

Figure 4:
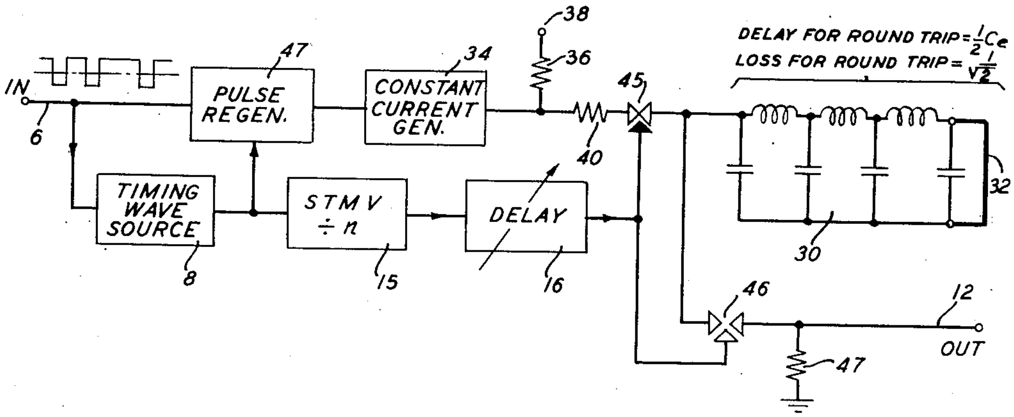
Fig. 4 is a block schematic diagram illustrating the invention in a second form.

The invention may also be embodied in a decoder in which only passive elements are employed in the decoding network. Such a decoder is illustrated in Fig. 4 of the drawings. Here the feedback network comprises a delay line 30 of electrical length equal to one-quarter of the pulse interval of the code groups to be decoded. Each code pulse is applied to one end of the delay line 30, travels the length thereof in one-quarter the code pulse intervals and is reflected with reversals of phase back to the input point to arrive thereat one-half pulse period later. Thereupon, a fraction $$\frac{1}{\sqrt{2}}$$

of this inverted returning pulse is reflected back into the line 30 to make another round trip, returning with reversed phase as a positive pulse of amplitude ½, and coinciding in time with the application of the next pulse to the line 30. This delay line 30 may be terminated in various ways, for example, the far end of the line may be provided with a short circuit termination 32 to provide a complete reflection with phase reversal, while the input end of the line is so terminated that a fraction 0.293 of the pulse reflected from the far end is absorbed in the termination while the residue, 0.707 is reflected back into the line. Alternatively, the far end of the line may be terminated to produce reflection of $$\frac{1}{\sqrt{2}}$$

of any pulse arriving from the input end of the line. Other arrangements in which the loss of the line is produced partially at one end and partially at the other may also be employed.

In the embodiment illustrated in Fig. 4 the delay line is indicated as made up of a plurality of sections each comprising a series inductor and a shunt capacitor. The lower terminals of the shunt capacitors are connected together and to ground. Where the frequencies employed are suitable, a practical delay line may comprise a solid dielectric cable of the proper length. The code group pulses incoming on the conductor 6 are applied to a pulse regenerator 7 employing conventional clipping and limiting amplifiers or equivalent circuits to reshape the pulses so negative output pulses of equal length and of equal amplitudes, taken as $\sqrt{2A}$, are produced at the output terminal of the regenerator 7 in response to all the "on" pulses of the received code groups. These pulses are applied to control a constant current generator 34 which, in the presence of an "on" pulse, draws a constant current through resistor 36 from a source connected to terminal 38. The pulses produced by the constant current generator 34 are applied through a resistor 40 to the input point of the delay line 30.

Thus for each "on" code element pulse, a negative pulse of amplitude $\sqrt{2A}$ is sent down the delay line 30. After an interval equal to one-half interpulse interval of the code group this pulse returns, after a first round trip, as a positive pulse of amplitude A to the input end of the line. The termination of the input end of the line comprising resistors 36 and 40 is so proportioned that a fraction 0.293A of the pulse returning to the input end of the line is absorbed and the residue, 0.707A is reflected back into the line. After two more complete round trips through the delay line 30 the pulse originally applied thereto has a positive amplitude equal to A/2 and in time coincidence with the application of the next input pulse to the line 30. As in the case of the decoder previously described, this pulse appears at the input end of the delay line 30 after successive code element intervals with amplitudes equal respectively to A/2, A/4, etc. Pulses applied to the input end of the delay line 30 in succeeding code element intervals are similarly attenuated. At the completion of the code group the sum of the contributions from the several attenuated pulses, plus the last pulse to be applied, is equal to the amplitude represented by the code group.

This summation pulse is applied to a sampler 14 which is controlled as before by the output of the single trip multivibrator 15 through the delay device 16. The feedback network 30 may be cleared and placed in readiness for the decoding of the ensuing pulse code group by the application of control pulses derived from the single trip multivibrator 15 and timed to coincide with the last half pulse interval of each group to the control terminals an auxiliary switch 45, normally closed, thus to open it. Opening of switch 45 prevents any residual pulse which may still be circulating in the network 30 from reaching the reflecting network 36, 40 while closing the switch 14 connects the network 30 to a load resistor 47 proportioned to match the impedance of the network 30 and thus to absorb any residual network circulating pulse without reflection.

In each form of the invention shown, the resulting amplitude sample may advantageously be passed through a low pass filter to eliminate the code group frequency from the output signals and to provide an output representative of the original signal wave.

The invention is evidently applicable to a system in which each pulse of an incoming group except the last makes any even number of round trips in each pulse interval T, e. g., four or six, or eight, etc., instead of two, the gain (or loss) of the feedback network and its delay being adjusted accordingly. In general, for an even number $2m$ of such round trips, the gain G (or loss L) and the delay D per round trip are given by $$G,L=(2)^{\frac{1}{2r}}$$

$$D=\frac{T}{2r}$$

where $r$ is any integer. It is this even number relation which permits the use of phase inversion and so reduces the stringency of the network design requirements.

The invention is equally applicable to the decoding of code pulse groups arranged in the three-valued or ternary code, in the four-valued or quaternary code, or, in general, in a code in which each pulse may adopt any one of a number $m$ of discrete values. Considering the ternary code by way of example, the possible values which any pulse may have can be taken arbitrarily as 0, 1, or 2. A pulse in the position of the code element of lowest denominational order thus represents a signal amplitude fraction of 0, 1, or 2. A pulse in the element position of next lowest denominational order represents an amplitude fraction of 0, 3, or 6; in the third position is represents an amplitude of 0, 9, or 18; in the fourth position it represents an amplitude of 0, 27, or 54, and so on.

Taking, for example, a four-element code pulse group, 1 2–0 1, in which the first pulse represents the code element of highest denominational order, this represents a signal amplitude sample of fifty-four units. To decode such a code pulse group and recover the signal amplitude, it is only necessary that the gain or loss of the feedback network be adjusted to the value $$(3)^{\frac{1}{2r}}$$

in accordance with the general formula given above. In the simplest case of two pulse round trips per code element, this means adjustment to the value $\sqrt{3}$. As before, the delay introduced in the feedback network should be adjusted to $$\frac{T}{2r}$$

where T is the interpulse interval. In the simplest case of two round trips per code element, this reduces to one-half interpulse interval.

With these adjustments, application of the pulses of the foregoing code pulse group in descending denominational order to the feedback network produces, for 0, 2, 4 and 6 round trips of the first second, third and fourth pulses to arrive, the following series of amplitudes:

| Round Trips: | 0 | 2 | 4 | 6 |
|---|---|---|---|---|
| First pulse: | 1 | 3 | 9 | 27 |
| Second pulse: | | 2 | 6 | 18 |
| Third pulse: | | | 0 | 0 |
| Fourth pulse: | | | | 1 |
| | | | | 46 |

Evidently, a sampling operation at the conclusion of the code pulse group adds the contributions in the last column and gives the correct decoded amplitude.

If the pulses are arranged in descending denominational order, the feedback network should be proportioned to introduce a loss of the same magnitude.

From the foregoing it will be understood that the invention is of general application and is independent of the number of code elements in the code, of the number of different values which each code element may adopt, and of the number of round trips which each pulse makes through the feedback network for a single code element, provided only that the latter is an even number.

The essential elements and adjustments of the decoding apparatus of this application are similar to the essential elements and adjustments of certain coding apparatus of a copending application of R. L. Carbrey, Serial No. 574,562, filed March 28, 1956. It will readily be apparent to the reader how these essential elements of a single circuit may be employed for coding and for decoding alternatively by the combination therewith of the slicer of the copending application for coding and of the evaluator of the present application for decoding.

What is claimed is:

1. In a system for decoding groups of $m$-valued pulses occurring at equal intervals, each pulse representing a portion of the amplitude of a signal wave, a feedback network having, for each pulse round trip, a transmission characteristic of $$(m)^{\frac{1}{2r}}$$

and a delay equal to $$\frac{T}{2r}$$

where $r$ is any integer and T is the interval between said pulses, means for applying the code group pulses to said network, and means for sampling the energy traversing the network at the conclusion of the code group.

2. In combination with apparatus as defined in claim 1, means, synchronized with incoming code pulse groups, for briefly disabling said network at the conclusion of each code pulse group.

3. In a system for decoding code groups of two-valued pulses occurring at equal intervals, each pulse of one value representing a portion of the amplitude of a signal wave, a feedback network having, for each pulse round trip, a transmission characteristic of $$(2)^{\frac{1}{2r}}$$

and a delay equal to $$\frac{T}{2r}$$

where $r$ is any integer and T is the interval between said pulses, means for applying a pulse to said network in response to each code group pulse of said one value, and means of sampling the energy traversing the network at the conclusion of a code group.

4. In combination with apparatus as defined in claim 3, means, synchronized with incoming code pulse groups, for briefly disabling said network at the conclusion of each code pulse group.

5. In a system for decoding code groups of two-valued pulses occurring at equal intervals, each pulse representing in one value a portion of the amplitude of a signal wave, a feedback network having, for each pulse round trip, a transmission characteristic of $\sqrt{2}$ and a delay equal to one-half the interval between said pulses, means for applying equal pulses to said network in response to each code group pulse of said one value and means for sampling the energy traversing the network at the completion of a code group.

6. In combination with apparatus as defined in claim 5, means, synchronized with incoming code pulse groups, for briefly disabling said network at the conclusion of each code pulse group.

7. In a system for decoding code groups of two-valued pulses occurring at equal intervals, each pulse of one value representing a portion of the amplitude of a signal wave, a network comprising a feedback loop having a feedback factor of $\sqrt{2}$ and a delay around the feedback loop equal to one-half the interval between said pulses, means for introducing a pulse into said loop in response to each code group pulse of said one value and means for sampling the energy circulating in the loop at the conclusion of a code group.

8. In combination with apparatus as defined in claim 7, means, synchronized with incoming code pulse groups, for briefly disabling said network at the conclusion of each code pulse group.

9. In a system for decoding code groups of two-valued pulses occurring at equal intervals, each pulse of one value representing a portion of the amplitude of a signal wave and the pulses being transmitted in descending denominational order, a network comprising a feedback loop including a phase inverting amplifier and having a loop gain of $\sqrt{2}$ and a loop delay equal to one-half the interval between said pulses, means for introducing a pulse into said loop in response to each code group pulse of said one value and means for sampling the energy circulating in said loop at the conclusion of said code group.

10. In combination with apparatus as defined in claim 9, means, synchronized with incoming code pulse groups, for briefly disabling said network at the conclusion of each code pulse group.

11. In a system for decoding code groups of two-valued pulses occurring at equal intervals, each pulse of one value representing a portion of the amplitude of a signal wave and the pulses being transmitted in ascending denominational order, a network comprising a feedback loop having a loop loss of $\sqrt{2}$ and a loop delay equal to one-half the interval between said pulses, means for introducing a pulse into said loop in response to each code group pulse of said one value and means for sampling the energy circulating in said loop at the conclusion of said code group.

12. In a system for decoding code groups of $m$-valued pulses occurring at equal intervals each pulse representing a portion of the amplitude of a signal wave, a feedback network comprising a delay line of electrical length equal to one-quarter of the pulse interval of said code groups, said delay line being terminated to reflect all of the incident energy at one end and a fraction $$\frac{1}{\sqrt{m}}$$

of the incident energy at the other end, means for applying the code group pulses to said one end of the delay line, and means for sampling the total energy present at said one end of the delay line at the completion of the code group.

13. In a system for decoding code groups of $m$-valued pulses occurring at equal intervals each pulse representing a portion of the amplitude of a signal wave, a delay line of electrical length equal to one-quarter the interpulse interval of said code group, one end of the delay line being short circuited and the other terminated to provide reflection of a fraction $$\frac{1}{\sqrt{m}}$$

of the energy incident thereupon, means for applying the pulses of code groups to be decoded to the terminated end of said delay line, and means for sampling the total amount of energy present at the terminated end of the delay line at the completion of a code group.

14. In a system for decoding received code groups of two-valued pulses occurring at equal intervals, each pulse of one value representing a portion of the amplitude of a signal wave, said pulses being received in descending denominational order, a phase inverting amplifier of substantial gain, having an input terminal and an output terminal, a first reactance-free feedback path extending from said output terminal to said input terminal for stabilizing the operation of said amplifier, said first path containing a first resistor for modifying the effective gain of said amplifier, a second feedback path extending from said output terminal to said input terminal and including a one-half interpulse interval delay device and a second resistor, said first and second resistors being so proportioned that the ratio of their resistances has the value $\sqrt{2}$, means for applying a pulse to said amplifier in response to each code group pulse of said one value, and means for sampling the output of said amplifier at the conclusion of said code pulse group.

15. In combination with apparatus as defined in claim 14, means, synchronized with incoming code pulse groups, for briefly disabling said amplifier at the conclusion of each code pulse group.

References Cited in the file of this patent

UNITED STATES PATENTS

| | | |
|---|---|---|
| 2,579,302 | Carbrey | Dec. 18, 1951 |
| 2,610,295 | Carbrey | Sept. 9, 1952 |

FOREIGN PATENTS

| | | |
|---|---|---|
| 511,214 | Belgium | Nov. 7, 1952 |